(12) United States Patent
Huber et al.

(10) Patent No.: US 8,714,490 B2
(45) Date of Patent: May 6, 2014

(54) ROLLER CONVEYOR

(75) Inventors: Thomas Huber, Schliersee (DE); Richard Holzner, Stephanskirchen (DE)

(73) Assignee: Telair International GmbH (DE)

( * ) Notice: Subject to any disclaimer, the term of this patent is extended or adjusted under 35 U.S.C. 154(b) by 443 days.

(21) Appl. No.: 12/721,468

(22) Filed: Mar. 10, 2010

(65) Prior Publication Data

US 2010/0230545 A1 Sep. 16, 2010

(30) Foreign Application Priority Data

Mar. 10, 2009 (DE) .......................... 10 2009 012 426

(51) Int. Cl.
- *B64C 1/22* (2006.01)
- *B64D 1/08* (2006.01)
- *B64D 9/00* (2006.01)

(52) U.S. Cl.
USPC ...................................................... 244/137.1

(58) Field of Classification Search
USPC ...................... 244/119, 137.1; 410/77, 84, 92
See application file for complete search history.

(56) References Cited

U.S. PATENT DOCUMENTS

| | | | | |
|---|---|---|---|---|
| 3,203,527 A | * | 8/1965 | Daetwyler | 193/35 SS |
| 3,357,372 A | | 12/1967 | Bader | |
| 3,915,275 A | * | 10/1975 | Specht | 193/35 R |
| 4,039,163 A | * | 8/1977 | Shorey | 244/137.1 |
| 4,077,590 A | * | 3/1978 | Shorey | 410/77 |
| 4,395,172 A | * | 7/1983 | Hoener et al. | 410/84 |
| 7,748,510 B2 | * | 7/2010 | Greenwood et al. | 193/35 R |
| 2007/0176048 A1 | * | 8/2007 | Huber et al. | 244/119 |

FOREIGN PATENT DOCUMENTS

| | | |
|---|---|---|
| DE | 1060264 | 6/1959 |
| DE | 23 43 104 C3 | 9/1977 |
| DE | 198 12 014 C1 | 8/1999 |
| DE | 100 43 180 B4 | 8/2005 |
| EP | 1 646 556 B1 | 4/2006 |
| EP | 1 646 557 B1 | 4/2006 |
| GB | 2447116 A | 9/2008 |

* cited by examiner

*Primary Examiner* — Valentina Xavier

(74) *Attorney, Agent, or Firm* — Barnes & Thornburg LLP

(57) ABSTRACT

A floor module with roller conveyors which define an aircraft cargo hold floor with a loading level is provided. The floor modules have cross-members to which the roller conveyor is attached. A rail with two side pieces is provided, between which rollers are rotatably mounted in such a way that they protrude above upper edges of the rails. The side pieces are joined to one another by a floor section. To improve the strength of the floor module, the floor section has a bent region inclined in cross-section at an angle to the loading level, the bent region dividing the floor section into one partial section lying higher and one partial section lying lower relative to the upper edges.

8 Claims, 1 Drawing Sheet

ROLLER CONVEYOR

CROSS-REFERENCE TO RELATED APPLICATIONS

This application claims priority to foreign Patent Application No. DE 10 2009 012 426.8, filed on Mar. 10, 2009, the disclosure of which is incorporated herein by reference in its entirety.

FIELD OF THE INVENTION

The present invention relates to a roller conveyor of a floor module of an aircraft cargo hold floor.

BACKGROUND OF THE INVENTION

Disclosed in EP 1 646 556 B1 and in EP 1 646 557 B1 is a cargo deck for accommodating cargo in the cargo hold of an aircraft, said deck being constructed of modules which may be assembled outside the aircraft hull and installed in the aircraft in a largely pre-assembled state. These floor modules must demonstrate high stability both considered on their own (during assembly and installation in the aircraft) and also later in the aircraft.

Roller conveyors which join cross-members of the floor modules to floor panels account for a significant proportion of the stability.

SUMMARY OF THE INVENTION

Embodiments of the present invention advantageously provide a roller conveyor of the type referred to at the outset to the effect that increased stability of the floor modules is ensured.

In one embodiment, a roller conveyor of a floor module of an aircraft cargo hull floor which defines a loading level, wherein the floor module has cross-members, to which the roller conveyor is attached, comprises a rail with two side pieces, between which rollers are rotatably mounted in such a way that they protrude above upper edges of the rail, and a floor section wherein the floor section has a bent area inclined in cross-section to the loading level, said bent area dividing the floor section into one partial section lying higher and one partial section lying lower relative to the upper edges.

One advantage of the present invention is that the roller conveyor gains increased stiffness in the longitudinal direction (of the aircraft) due to bending of the rail's floor section without it being necessary for any increase in material expenditure. Unlike customary roller conveyors where the material of the floor region does not contribute any additional bending resistance in the rail's longitudinal direction, a significant improvement in the bending resistance is achieved with the design of the floor region according to the invention.

Preferably the rail has an outer flange on which is attached a stabilization element running at an angle to the loading level. In this case, therefore, the roller conveyor or the rail is mounted at the edge of the floor module. As a result this stabilization element imparts increased stiffness to the roller conveyor which in turn makes the floor modules "firmer."

If the roller conveyor is installed on the edge of the floor module, then it is an advantage if the stabilization element comprises a stabilization strip provided with a stopper region, said stabilization strip being higher, in sections at least, relative to the loading level than the upper edges of the rail. On one hand an increase in the bending resistance is achieved, while on the other a stopper for loads (containers) moved on the roller conveyor is realized at the same time. So here it is a case of "killing two birds with one stone."

The stabilization element may further comprise a bent sheet metal element which is permanently joined to the rail. Such a sheet metal element has a low weight but nevertheless additionally increases the rail's bending resistance. Moreover, covering the marginal regions between the floor modules and the aircraft hull is ensured at the same time such that here too multifunctionality is guaranteed.

The rail is preferably manufactured as an extruded section, in particular from aluminum. This is cost-effective.

The stopper rail is also preferably manufactured from fiber-reinforced plastic. This achieves high strength at relatively low weight on one hand and on the other it also provides sufficiently high wear resistance which is appropriate for such a stopper. Finally, such materials also have relatively low coefficients of friction which is advantageous if a container is being moved in the cargo hold in contact with the stopper strip.

BRIEF DESCRIPTION OF THE DRAWINGS

The invention will be explained in greater detail in the following on the basis of an exemplary embodiment which is illustrated in the associated drawings.

DETAILED DESCRIPTION

Figure 2:
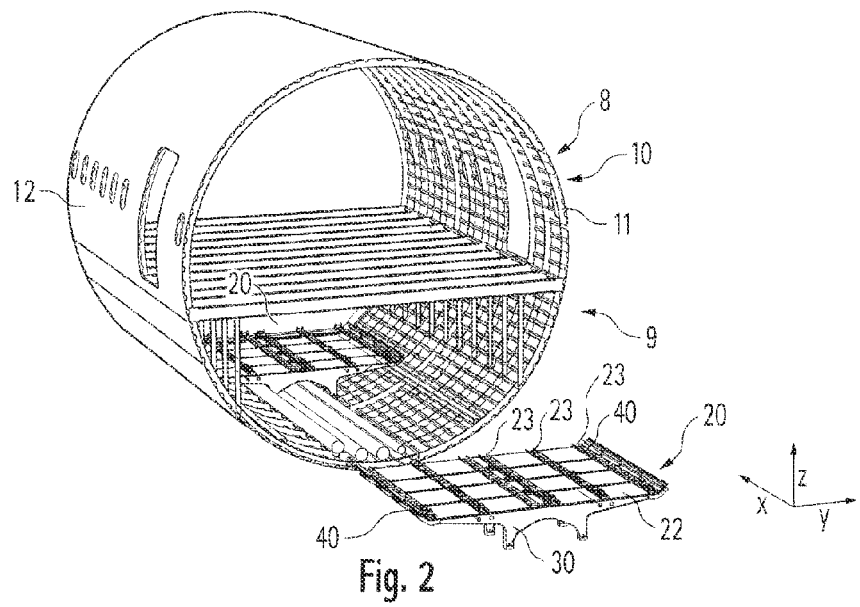
FIG. 2 is a perspective diagram of an aircraft hull section with a floor module.

The invention will now be described with reference to the drawing figures, in which like reference numerals refer to like parts throughout.

FIG. 2 illustrates a portion of an aircraft hull with a floor module. Such a floor module 20 has cross-members 30 which are joined to one another by way of roller conveyors 23 and marginal roller conveyors or rails 40. Additionally provided are floor panels 22 which are installed between roller conveyors 23 or 40 and cross-member 30 such that a walkable surface is created. Panels 22 or the surface of floor module 20 form a loading level in the X-Y direction as is indicated by a coordinate system in FIG. 2. Such floor modules 20 may be assembled outside an aircraft hull 10 that has an upper section 8 and a lower section 9 in which a cargo hold is created.

Figure 3:
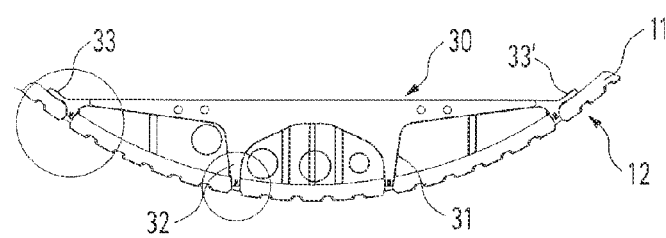
FIG. 3 is a partial view from above onto a floor module with associated hull section.

Floor modules 20 are attached to ribs 11 using end sections of cross-members 30 as is illustrated in FIGS. 2 and 3. End sections 33, 33' of cross-member 30 are also attached to ribs 11 or to an outer skin 12 of hull 10 when floor module 20 is installed in the aircraft hull following its assembly (which takes place outside the aircraft hull).

Figure 1:
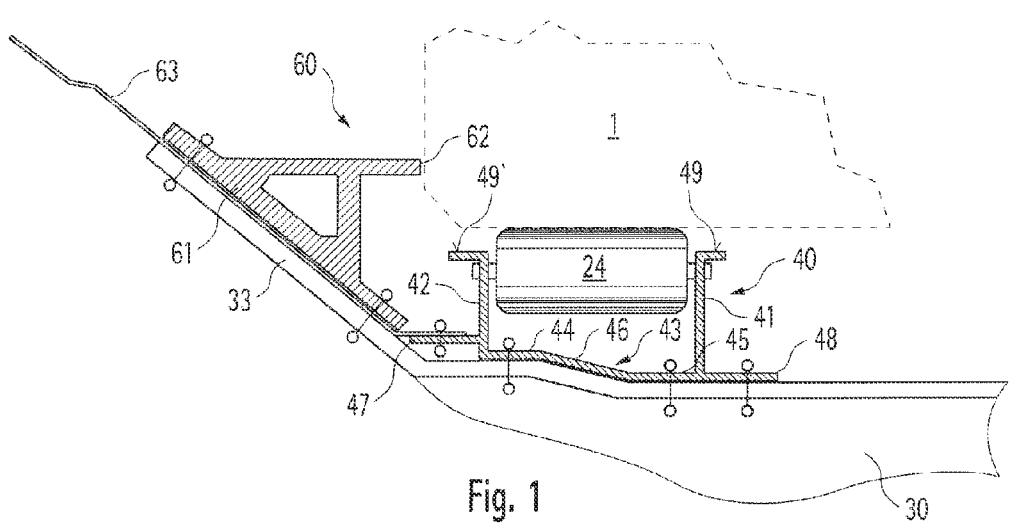
FIG. 1 is a cross-section through a roller conveyor with stabilization element according to an embodiment of the invention.

As illustrated in FIG. 1, rail 40 which forms a marginal roller conveyor is constructed such that rollers 24 are rotatably mounted in such a way between side pieces 41, 42, extending in X-Z direction, that their external circumference protrudes above upper edges 49, 49' of rail 40.

Side pieces 41, 42 are joined to one another by a floor section 43 having a bent region 46. Bent region 46 joins a higher partial section 44 to a lower partial section 45 (seen relative to upper edges 49, 49' or loading level X-Y) such that this bent region 46 runs from top left to bottom right in FIG. 1. Rail 40 obtains increased stability in the longitudinal direction due to this bent region.

Rail 40 is also provided with an inner flange 48 that serves for support and attachment of floor panels 22.

Firmly attached to an outer flange 47 of rail 40 is a sheet metal element 43 that also runs at an angle from top left to bottom right.

Rail 40 is joined to cross-member 30 at a plurality of points that are represented schematically in FIG. 1 by lines with thickened end points. These are preferably screw or rivet joints. Such joints also fix metal sheet 63 on outer flange 47 of rail 40 and join metal sheet 63 to end section 33 of cross-member 30.

Further provided is a stabilization strip 61 that is designed as a hollow plastic section and together with metal sheet 63 is joined to end section 33 of cross-member 30. Thus this stabilization strip 61 together with sheet metal element 63 and the joint with outer flange 47 to rail 40 forms a further stabilization element 60 for rail 40 or for entire floor module 20.

Stabilization strip 61 has a stopper region 62 that lies above upper edges 49, 49' of rail 40. By means of this, containers 1, which are moved on rollers 24, can be moved with their outer margin sliding along on stopper region 62. At this point it should be noted that container 1 is merely represented schematically, its customary special construction with a circumferential outer flange is not shown.

It emerges from the above that with the present invention an especially bending-resistant floor module 20 is created by combining individual structural elements and their special design.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. Roller conveyor of a floor module of an aircraft cargo hold floor which defines a loading level, wherein the floor module has cross-members on which the roller conveyor is attached, comprising:
    a rail with two side pieces between which rollers are rotatably mounted to protrude above upper edges of the rail; and
    a floor section, joining the side pieces, having a bent region inclined in cross-section at an angle to the loading level, the bent region dividing the floor section into one partial section lying higher and one partial section lying lower relative to the upper edges,
    wherein the rail has an outer flange on which a stabilization element running at an angle to the loading level is attached, and the stabilization element comprises a bent sheet metal element which is permanently joined to the rail.

2. Roller conveyor according to claim 1, wherein the stabilization element comprises a stabilization strip provided with a stopper region, the stabilization strip being disposed higher, in sections at least, relative to loading level than the upper edges of the rail.

3. Roller conveyor according to claim 1, wherein the rail is manufactured as an extruded aluminum section.

4. Roller conveyor according to claim 2, wherein the stabilization strip is manufactured from a fiber-reinforced plastic.

5. A roller conveyor of a floor module of an aircraft cargo hold floor which defines a loading level, wherein the floor module has cross-members on which the roller conveyor is attached, comprising:
    a rail including a first side piece and a second side piece between which rollers are rotatably mounted to protrude above an upper edge of the rail, and an outer flange extending outwardly from the first side piece of the rail; and
    a floor section joining the first side piece and the second side piece, the floor section including a first partial section joined to and extending inwardly from the first side piece of the rail, a second partial section joined to and extending inwardly from the second side piece of the rail, and a bent region located between and joining the first partial section and the second partial section, the bent region adapted to be inclined at an angle to the loading level, the first partial section lying higher than the second partial section relative to the upper edge of the rail; and
    a stabilization element comprising a bent sheet metal element having a top end and a bottom end, the sheet metal element adapted to run at an angle to the loading level from the top end of the sheet metal element to the bottom end of the sheet metal element, the sheet metal element being permanently joined to the outer flange of the rail.

6. The roller conveyor of claim 5, wherein the stabilization element comprises a stabilization strip provided with a stopper region, the stabilization strip adapted to be disposed higher, in sections at least, relative to the loading level than the upper edge of the rail.

7. The roller conveyor of claim 5, wherein the stabilization element is adapted to be joined to an end section of a cross-member.

8. The roller conveyor of claim 5, wherein the bottom end of the sheet metal element is permanently joined to the outer flange of the rail.

* * * * *